(12) United States Patent
Miyamura et al.

(10) Patent No.: US 7,916,328 B2
(45) Date of Patent: Mar. 29, 2011

(54) IMAGE READING APPARATUS AND COMPUTER PROGRAM PRODUCT

(75) Inventors: Kazutoshi Miyamura, Ishikawa (JP); Seigo Kotani, Kanagawa (JP)

(73) Assignee: PFU Limited, Kanagawa (JP)

( * ) Notice: Subject to any disclaimer, the term of this patent is extended or adjusted under 35 U.S.C. 154(b) by 1113 days.

(21) Appl. No.: 11/622,382

(22) Filed: Jan. 11, 2007

(65) Prior Publication Data

US 2007/0165273 A1  Jul. 19, 2007

(30) Foreign Application Priority Data

Jan. 18, 2006  (JP) .................................. 2006-010358
Jun. 7, 2006  (JP) .................................. 2006-158722

(51) Int. Cl.
G06F 3/12 (2006.01)
G06K 15/00 (2006.01)
H04N 1/44 (2006.01)

(52) U.S. Cl. ........................ 358/1.15; 358/1.14; 380/246

(58) Field of Classification Search ................. 358/1.15, 358/1.16, 1.13, 539, 505, 514; 380/43, 232, 380/245, 246, 259, 264; 382/232, 235
See application file for complete search history.

(56) References Cited

U.S. PATENT DOCUMENTS

| | | | | |
|---|---|---|---|---|
| 6,332,193 B1 * | 12/2001 | Glass et al. | ................... | 713/170 |
| 6,681,084 B1 * | 1/2004 | Reijnders | ......................... | 399/44 |
| 7,289,964 B1 * | 10/2007 | Bowman-Amuah | ........... | 705/1.1 |
| 7,362,868 B2 * | 4/2008 | Madoukh et al. | ............. | 380/277 |
| 7,437,752 B2 * | 10/2008 | Heard et al. | ...................... | 726/1 |
| 7,477,740 B2 * | 1/2009 | Bennett | ......................... | 380/210 |
| 7,513,416 B1 * | 4/2009 | Mason et al. | .................. | 235/379 |
| 7,587,368 B2 * | 9/2009 | Felsher | ........................... | 705/65 |
| 7,757,101 B2 * | 7/2010 | Nonaka et al. | ................. | 713/194 |
| 2003/0225708 A1 * | 12/2003 | Park et al. | ........................ | 705/69 |
| 2004/0034766 A1 * | 2/2004 | Sakamura et al. | ................ | 713/2 |
| 2004/0174434 A1 * | 9/2004 | Walker et al. | ............... | 348/211.3 |
| 2005/0185225 A1 * | 8/2005 | Brawn et al. | ................... | 358/401 |
| 2005/0229008 A1 * | 10/2005 | Crane | ........................... | 713/186 |
| 2007/0006329 A1 * | 1/2007 | Morrow et al. | .................. | 726/34 |
| 2007/0016790 A1 * | 1/2007 | Brundage et al. | ............. | 713/176 |
| 2007/0085673 A1 * | 4/2007 | Krumm et al. | ................. | 340/521 |
| 2007/0136804 A1 * | 6/2007 | Ohsawa et al. | ................. | 726/14 |
| 2007/0165264 A1 * | 7/2007 | Minami et al. | ............... | 358/1.14 |
| 2007/0172222 A1 * | 7/2007 | Kakutani et al. | .............. | 396/266 |
| 2007/0241182 A1 * | 10/2007 | Buer | ............................. | 235/380 |
| 2007/0245137 A1 * | 10/2007 | Bhagat et al. | ................. | 713/153 |
| 2008/0092216 A1 * | 4/2008 | Kawano et al. | .................... | 726/5 |
| 2008/0094654 A1 * | 4/2008 | Troyansky et al. | .......... | 358/1.14 |
| 2008/0149713 A1 * | 6/2008 | Brundage | ..................... | 235/435 |
| 2008/0222427 A1 * | 9/2008 | Baentsch et al. | .............. | 713/189 |
| 2008/0297515 A1 * | 12/2008 | Bliss | ............................... | 345/473 |
| 2009/0083372 A1 * | 3/2009 | Teppler | ......................... | 709/203 |

(Continued)

FOREIGN PATENT DOCUMENTS

JP  11-331469  11/1999

(Continued)

*Primary Examiner* — Madeleine A Nguyen
(74) *Attorney, Agent, or Firm* — Lowe, Hauptman, Ham & Berner, LLP

(57) ABSTRACT

A recording unit records an operation log. A storing unit included in a temper-resistant chip stores therein a secret key unique to an image reading apparatus. An encrypting unit included in the temper-resistant chip encrypts recorded operation log with stored secret key. A transmitting unit transmits information including encrypted operation log to a server.

20 Claims, 11 Drawing Sheets

U.S. PATENT DOCUMENTS

| | | | |
|---|---|---|---|
| 2009/0132815 A1* | 5/2009 | Ginter et al. | 713/164 |
| 2009/0231441 A1* | 9/2009 | Walker et al. | 348/207.1 |
| 2009/0249073 A1* | 10/2009 | Wiseman et al. | 713/171 |
| 2010/0325438 A1* | 12/2010 | Buer | 713/175 |

FOREIGN PATENT DOCUMENTS

| | | |
|---|---|---|
| JP | 2003-189054 | 7/2003 |
| JP | 2005-317026 | 11/2005 |

* cited by examiner

IMAGE READING APPARATUS AND COMPUTER PROGRAM PRODUCT

RELATED APPLICATIONS

The present application is based on, and claims priority from, Japan Application Number 2006-010358, filed Jan. 18, 2006 and Japan Application Number 2006-158722, filed Jun. 7, 2006, the disclosures of which are hereby incorporated by reference herein in their entirety.

BACKGROUND OF THE INVENTION

1. Field of the Invention

The present invention relates to a technology for securing reliability and authenticity of an operation log of an image reading apparatus.

2. Description of the Related Art

Technologies for recording log information in an image reading apparatus used in a network system has been proposed. For example, Japanese Patent Application Laid-open No. H11-331469 discloses a technology for storing log information, such as a parameter for reading a document, a transmission parameter, and a destination of the transmission, and using the log information as required, so that operation efficiencies of re-using the same system, checking usage status, and performing a maintenance against a failure can be improved in the image reading apparatus in the network system. Japanese Patent Application Laid-open No. 2003-189054 discloses a technology for a method of managing a network scanner that can record log information and can reflect a reading mode that is frequently used by a user to the scanner as a default mode.

For a security enhancement independently promoted by each enterprise, a trusted computing group (TCG) as an industry organization of the enterprises that provide technologies for personal computer (PC) platforms contributes to develop and promote new hardware/software having higher reliability and security. Japanese Patent Application Laid-open No. 2005-317026 discloses a technology with which the TCG determines a specification of a trusted platform module (TPM) chip related to a security chip for a computing platform.

However, with the conventional technologies disclosed in above documents, usage information and log information can be fraudulently altered. Therefore, there still is a problem that reliability and credibility of the usage information and the log information cannot be secured.

SUMMARY OF THE INVENTION

It is an object of the present invention to at least partially solve the problems in the conventional technology.

An image reading apparatus according to one aspect of the present invention is connected to a server via a network. The image reading apparatus includes a recording unit that records an operation log; a tamper-resistant chip including a storing unit that stores therein a secret key unique to the image reading apparatus, and an encrypting unit that encrypts recorded operation log with stored secret key; and a transmitting unit that transmits information including encrypted operation log to the server.

An image reading apparatus according to another aspect of the present invention is connected to a server via a network. The image reading apparatus includes a recording unit that records an operation log; a generating unit that generates a hash value corresponding to recorded operation log; a tamper-resistant chip including a storing unit that stores a secret key unique to the image reading apparatus, and an encrypting unit that encrypts generated hash value with stored secret key; and a transmitting unit that transmits information including encrypted hash value and the recorded operation log to the server.

A computer program product according to still another aspect of the present invention includes a computer usable medium having computer readable program codes embodied in the medium that when executed cause a computer to execute recording an operation log; encrypting recorded operation log with a secret key that is unique to an image reading apparatus, which is stored in a tamper-resistant chip installed in the image reading apparatus; and transmitting encrypted operation log to a server that is connected to the image reading apparatus via a network.

A computer program product according to still another aspect of the present invention includes a computer usable medium having computer readable program codes embodied in the medium that when executed cause a computer to execute recording an operation log; generating a hash value corresponding to recorded operation log; encrypting generated hash value with a secret key that is unique to an image reading apparatus, which is stored in a tamper-resistant chip installed in the image reading apparatus; and transmitting encrypted hash value and the recorded operation log to a server that is connected to the image reading apparatus via a network.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are explained below in detail with reference to the accompanying drawings. The present invention is not limited to the embodiments explained below. For example, a TPM chip is explained as an example of a tamper-resistant chip according to the present invention. However the present invention is not thus limited.

Figure 1:
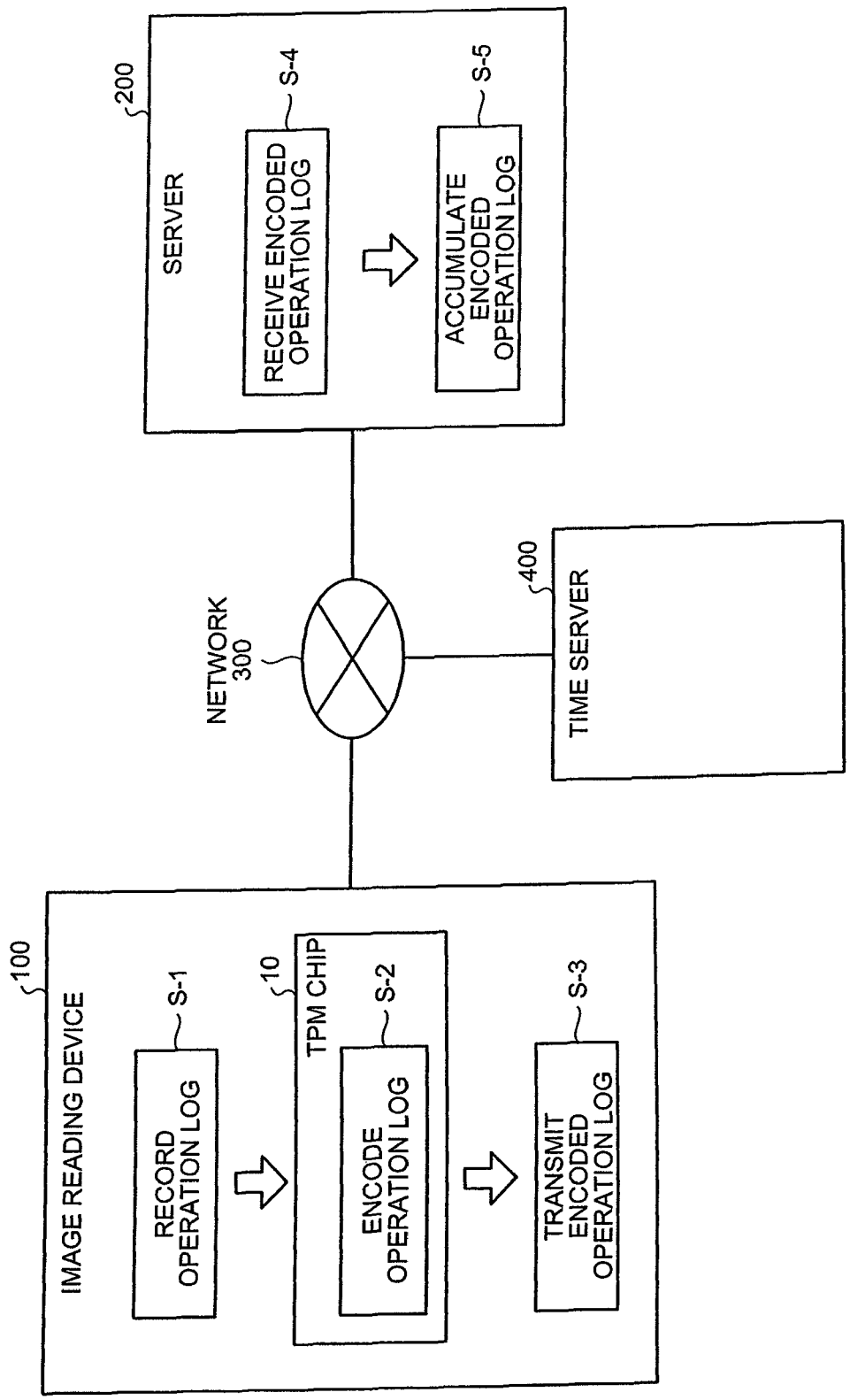
FIG. 1 is a schematic for explaining a general concept according to a first embodiment of the present invention.

FIG. 1 is a schematic for explaining a general concept of a system according to a first embodiment of the present invention. The system according to the first embodiment includes an image reading apparatus 100 such as a scanner, a printer, a multifunction product, or a facsimile apparatus, and a server 200 connected to the image reading apparatus 100 via a network 300. The image reading apparatus 100 includes a TPM chip 10 that has tamper resistance and stores a secret key unique to the image reading apparatus 100. As shown in FIG. 1, a time server 400 that manages time can be connected to the image reading apparatus 100 and the server 200 via the network 300.

The image reading apparatus 100 records an operation log of an operation for the image reading apparatus 100 (step S-1). The image reading apparatus 100 encrypts, through the TPM chip 10, the recorded operation log using the secret key unique to the image reading apparatus 100 at a regular time interval or when the image reading apparatus 100 receives a request from outside (step S-2). The image reading apparatus 100 transmits the encrypted operation log to the server 200 via the network 300 (step S-3). The server 200 receives the encrypted operation log transmitted from the image reading apparatus 100 (step S-4) and accumulates the encrypted operation log (step S-5).

If the time server 400 is connected to the image reading apparatus 100 and the server 200 via the network 300 as shown in FIG. 1, the image reading apparatus 100 acquires time information from the time server 400, attaches the acquired time information to the operation log recorded at step S-1, encrypts a time-stamped operation log, which is the operation log with the time information attached, through the TPM chip 10, and transmits the encrypted time-stamped operation log to the server 200.

The image reading apparatus 100 further includes at least one of a temperature sensor, a humidity sensor, and an altitude sensor.

The operation log includes reading parameter for reading a document (i.e., a document size, sheet feed condition (auto document feeder (ADF), flatbed (FB), single side, double side), resolution, or color/monochrome), number of read documents, time of reading the document, an error code, error occurrence time, user-identification information for identifying a user, room temperature, temperature of the image reading apparatus, humidity, or altitude.

Figure 2:
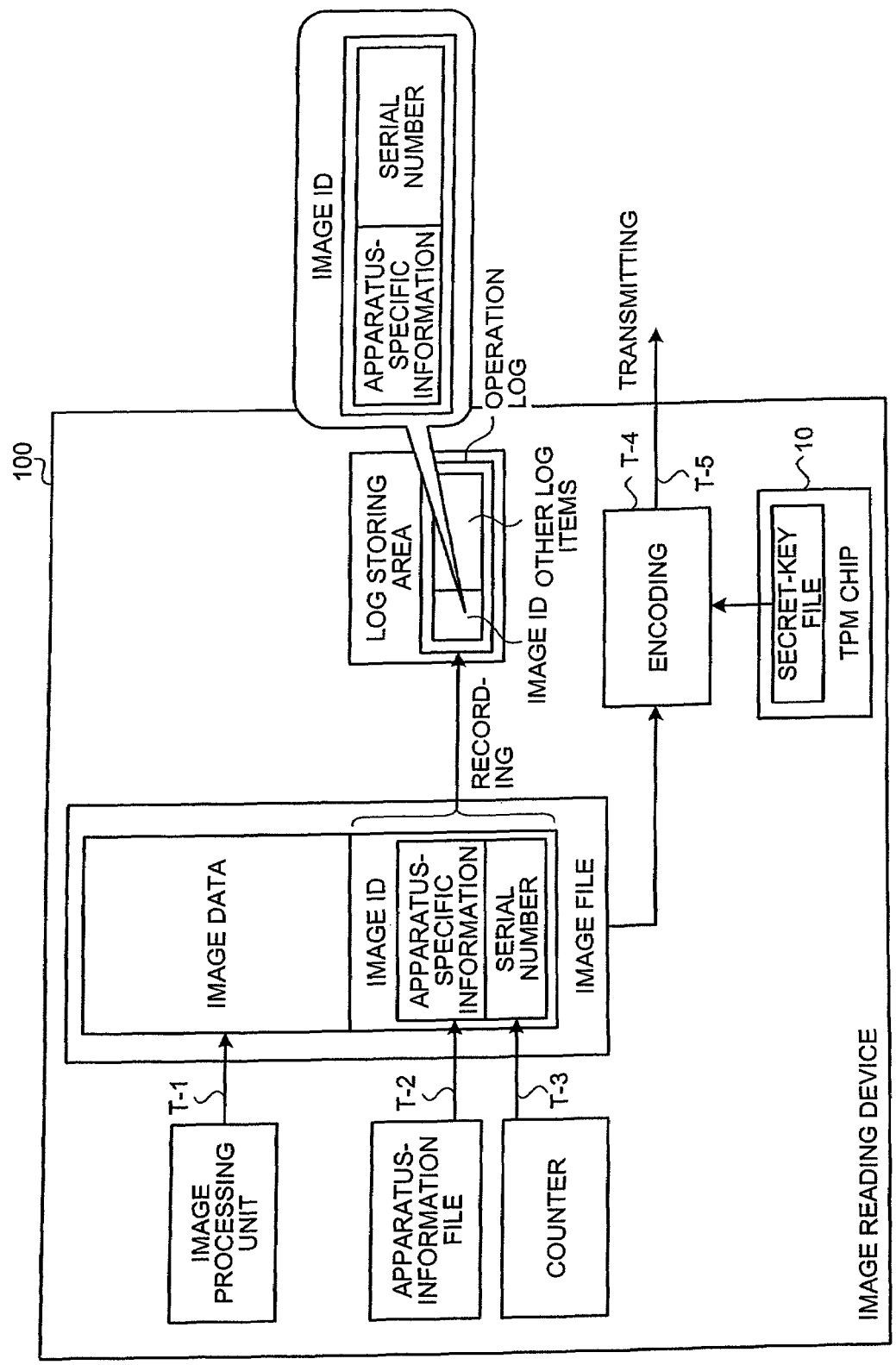
FIG. 2 is a schematic for explaining a general concept of the first embodiment.

FIG. 2 is a schematic for explaining a general concept of an operation of the image reading apparatus 100 according to the first embodiment. The image reading apparatus 100 retrieves image data by an image processing unit included in the image reading apparatus 100 (step T-1). The image reading apparatus 100 generates the image identification information such as an image identification (ID) for identifying the image data retrieved at step T-1, attaches the generated image identification information to the image data retrieved at step T-1, through the TPM chip 10, and generates an image file including the image data and the image identification information. If the image identification information includes apparatus-specific information unique to the image reading apparatus 100 and a serial number, the image reading apparatus 100 acquires the apparatus-specific information from the apparatus-information file installed in the image reading apparatus 100 (step T-2), and at the same time, acquires a serial number, generated (updated) at a counter when the image data is retrieved at step S-1 (step T-3). The image reading apparatus 100 generates the image identification information by combining the acquired apparatus-specific information and the serial number, and stores (records) the generated image identification information, as a portion of the operation log, into a predetermined storage area (log storing area) in the image reading apparatus 100. The operation log collected by the TPM chip 10 is accumulated in a storage device such as a hard disk drive equipped with the image reading apparatus 100. The TPM chip 10 stores a hash value corresponding to the operation log and/or an address associated with a storage area of the operation log. Alternately, the hash value of the operation log and/or the address associated with the storage area of the operation log can be stored in a storage device such as a hard disk drive, if the hash value and the address are encrypted using the secret key unique to the TPM chip 10.

The image identification information can include the apparatus-specific information and time information acquired by the image reading apparatus 100 from the time server 400 that is connected to the image reading apparatus 100 via the network 300 and manages time. The counter is an updating unit that updates a serial number stored in advance in the image reading apparatus 100 every time the image reading apparatus 100 retrieves the image data. The counter can be, for example, a monotonic counter equipped through the TPM chip 10.

The operation log can include other log items in addition to the image identification information. The other log items can be, for example, reading parameter for reading the image data, number of read image data, time of reading the image data, an error code related to an error occurred in the image reading apparatus 100, error occurrence time, user-identification information for identifying a user operating the image reading apparatus 100, room temperature and temperature of the image reading apparatus 100 detected by the temperature sensor equipped with the image reading apparatus 100, humidity detected by the humidity sensor equipped with the image reading apparatus 100, and altitude detected by the altitude sensor equipped with the image reading apparatus 100.

Referring back to FIG. 2, the image reading apparatus 100 encrypts, through the TPM chip 10, the image file using the secret key stored in the secret-key file in the TPM chip 10 (step T-4). The image reading apparatus 100 transmits the image file encrypted at step T-4 to, for example, a personal computer or the server 200, connected to the image reading apparatus 100 (step T-5). Accordingly, the personal computer and the server 200 can accumulate the operation log in addition to the image data.

As described above, with the image reading apparatus 100 according to the present invention, it becomes possible to specify from which image reading apparatus the image data having an image ID is output, by referring to the accumulated operation log. Therefore, a traceability of the image data can be assured. Further, the image data attached with the image ID is encrypted when being transmitted to the other devices. Thereby, a fraudulent alteration of the image ID on a transmission path can be detected, resulting in improving reliability of the image data.

Figure 3:
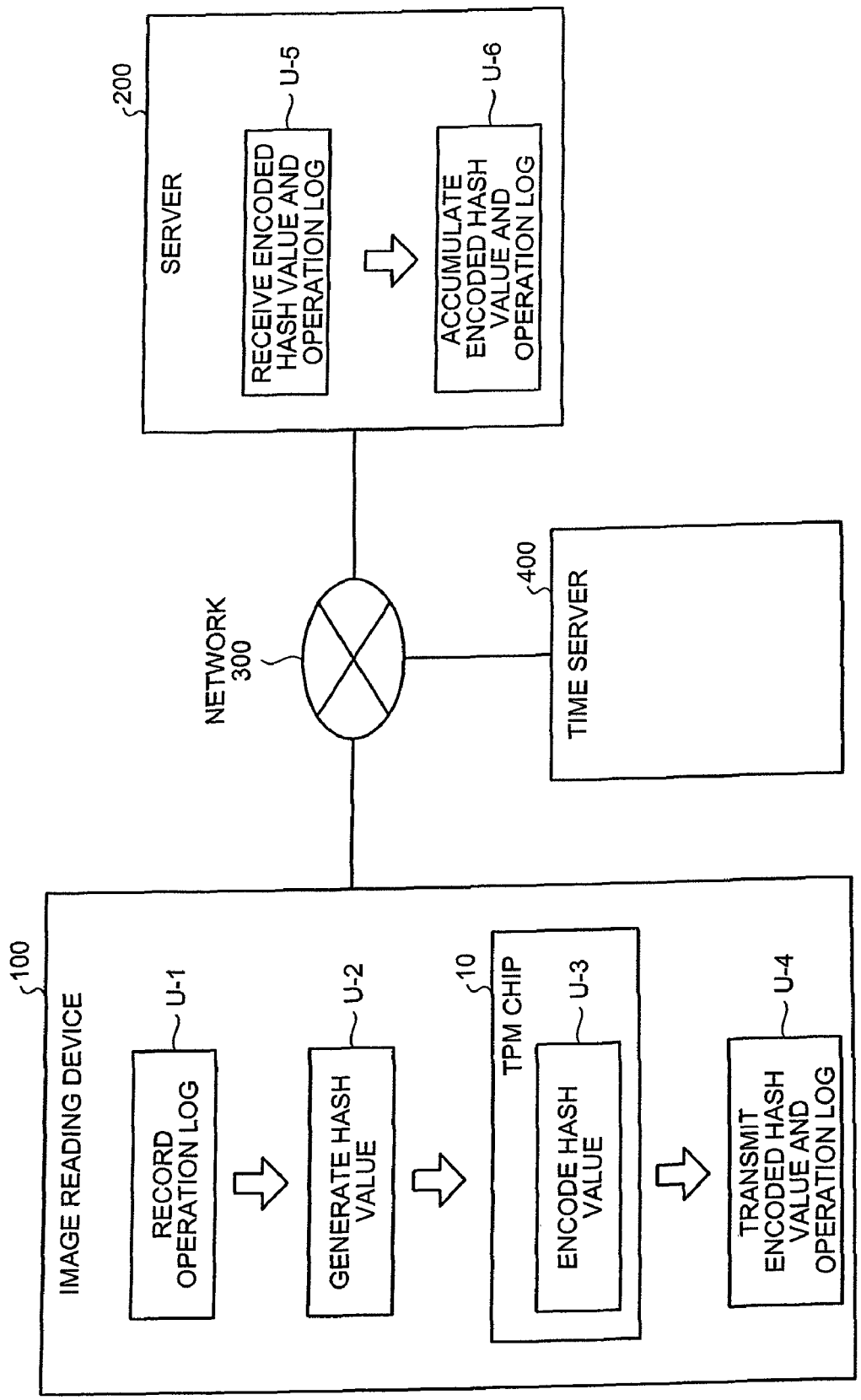
FIG. 3 is a schematic for explaining a general concept according to a second embodiment of the present invention.

FIG. 3 is a schematic for explaining a general concept according to a second embodiment of the present invention. The image reading apparatus 100 records the operation log of the operation for the image reading apparatus 100 (step U-1). The image reading apparatus 100 generates the hash value corresponding to the operation log recorded at step U-1. The image reading apparatus 100 encrypts, through the TPM chip 10, the generated hash value using the secret key unique to the image reading apparatus 100 at a regular time interval or when the image reading apparatus 100 receives a request from outside (step U-3). The image reading apparatus 100 transmits the encrypted hash value and the operation log to the server 200 via the network 300 (step U-4). The server 200 receives the encrypted hash value and the operation log transmitted from the image reading apparatus 100 (step U-5) and accumulates the received hash value and the operation log (step U-6).

If the time server 400 is connected to the image reading apparatus 100 and the server 200 via the network 300 as shown in FIG. 3, the image reading apparatus 100 acquires the time information from the time server 400, attaches the acquired time information to the operation log recorded at step U-1, encrypts the time-stamped operation log to which the time information is attached, through the TPM chip 10, and transmits the encrypted hash value and the time-stamped operation log to the server 200.

Figure 4:
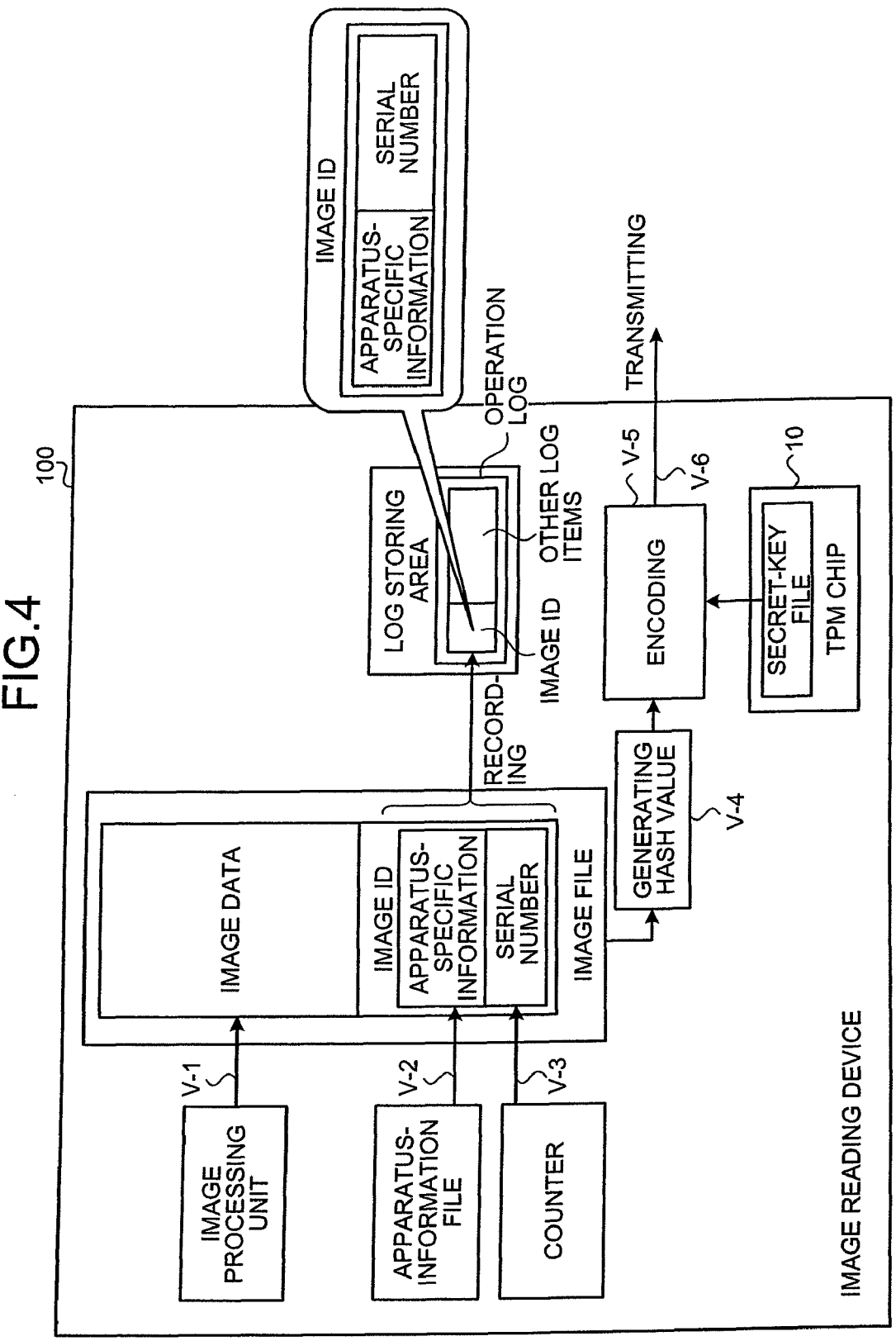
FIG. 4 is a schematic for explaining a general concept of the second embodiment.

FIG. 4 is a schematic for explaining a general concept of an operation of the image reading apparatus 100 according to the second embodiment. The image reading apparatus 100 retrieves image data by the image processing unit installed in the image reading apparatus 100 (step V-1). The image reading apparatus 100 generates the image identification information such as the image ID for identifying the image data retrieved at step V-1, attaches the generated image identification information to the image data retrieved at step V-1, through the TPM chip 10, and generates the image file including the image data and the image identification information. If the image identification includes the apparatus-specific information unique to the image reading apparatus 100 and the serial number, the image reading apparatus 100 acquires the apparatus-specific information from the apparatus-information file installed in the image reading apparatus 100 (step V-2), and at the same time, acquires the serial number generated (updated) at the counter every time the image data is retrieved at step V-1 (step V-3). The image reading apparatus 100 generates the image identification information by combining the acquired apparatus-specific information and the serial number, and stores (records) the generated image identification information, as a portion of the operation log, into the predetermined storage area (log storing area) in the image reading apparatus 100.

The image reading apparatus 100 generates the hash value corresponding to the image file (step V-4) and encrypts the hash value, through the TPM chip 10, using the secret key stored in the secret-key file in the TPM chip 10 (step V-5). The image reading apparatus 100 transmits the hash value encrypted at step V-5 and the operation log to, for example, a personal computer or the server 200, connected to the image reading apparatus 100 (step V-6).

With the image reading apparatus 100 according to the present invention, it becomes possible to specify from which image reading apparatus the image data having an image ID is output, by referring to the accumulated operation log. Therefore, a traceability of the image data can be assured. Further, the image data with the image ID is attached with an electronic signature when being transmitted to the other devices. Thereby, a fraudulent alteration of the image ID on a transmission path can be detected, resulting in improving reliability of the image data.

Figure 5:
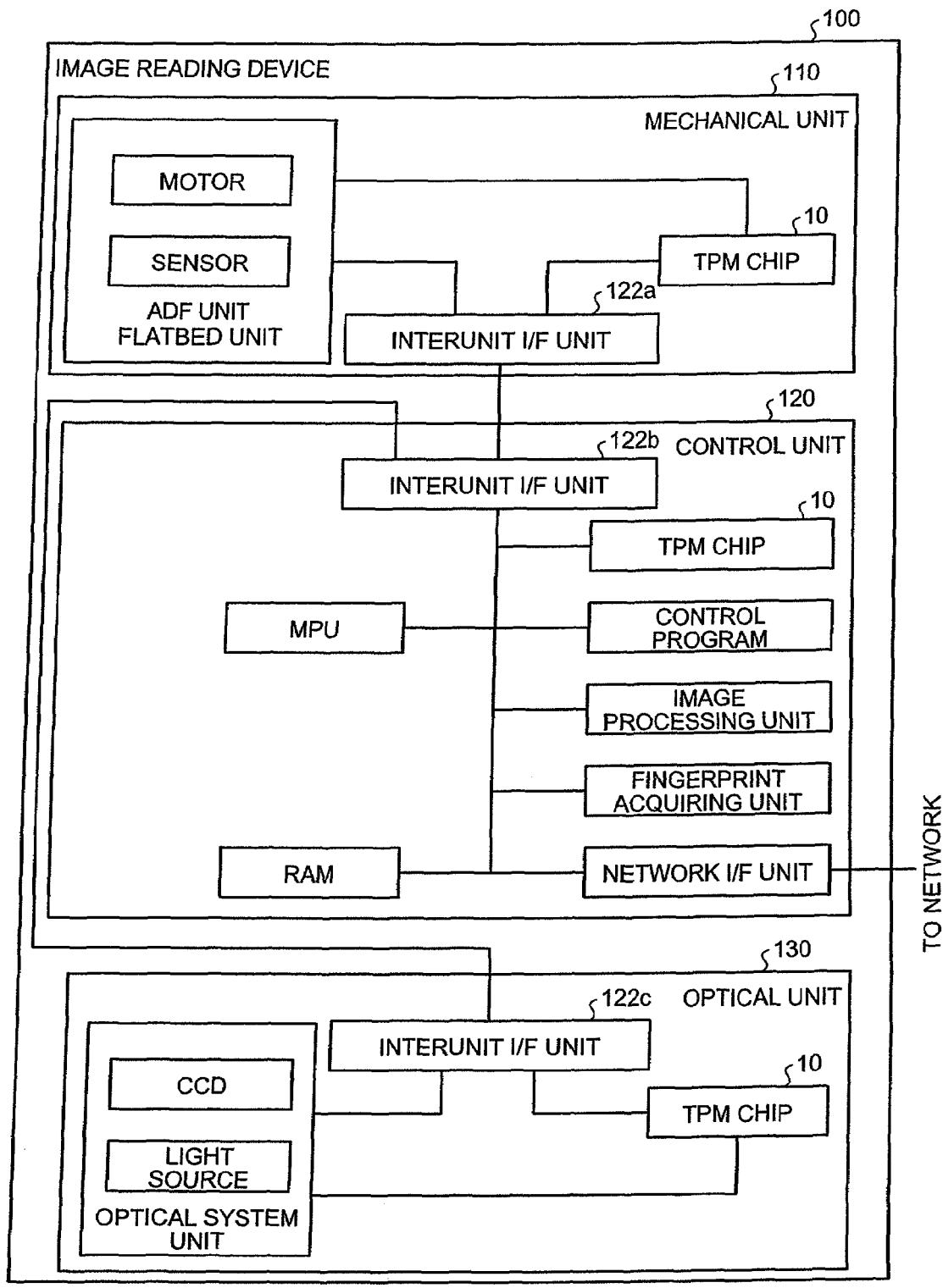
FIG. 5 is a block diagram of an image reading apparatus according to the present invention.

FIG. 5 is a block diagram of the image reading apparatus 100. The image reading apparatus 100 generally includes, as a minimal configuration, a mechanical unit 110, a control unit 120, and an optical unit 130. The image reading apparatus 100 includes the TPM chip 10 having tamper resistance, with respect to each unit for collecting information related to each unit and recording the collected information in the TPM chip 10. The TPM chip 10 stores the secret key necessary for creating the electronic signature and performing encrypting. Further, the TPM chip 10 can include a user-authentication function for performing an authentication with, for example, a fingerprint. The TPM chip 10 is provided in a body of each unit so that the TPM chip 10 cannot easily be removed from outside, with a configuration with which the unit cannot become active if the TPM chip 10 is removed.

The mechanical unit 110 includes an ADF unit/flatbed unit including a motor and a sensor, and the TPM chip 10 interconnected to the ADF unit/flatbed unit via an interunit interface (I/F) unit 122a. The control unit 120 includes a micro processing unit (MPU), a memory unit that stores a control program, an image processing unit, a fingerprint acquiring unit, a network I/F, a random access memory (RAM), and the TPM chip 10, which are all interconnected via an interunit I/F unit 122b. The optical unit 130 includes an optical system unit including a change coupled device (CCD) and a light source, and the TPM chip 10, which are interconnected via an interunit I/F unit 122c.

Each unit (the mechanical unit 110, the control unit 120, and the optical unit 130) can include various sensors (the temperature sensor, the humidity sensor, and the altitude sensor) to measure an environment (temperature, humidity, altitude) of each unit.

Figure 6:
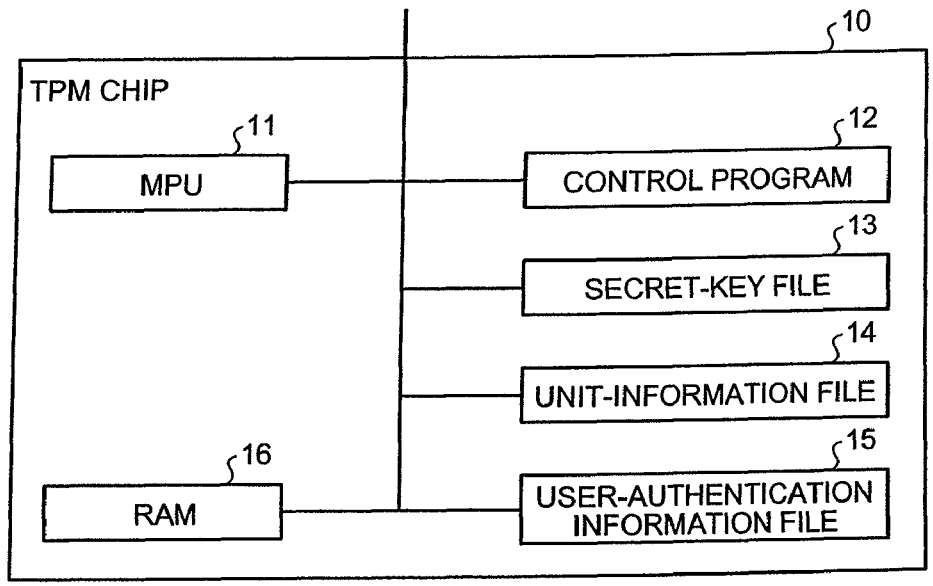
FIG. 6 is a block diagram of a TPM chip according to the present invention.

FIG. 6 is a block diagram of the TPM chip 10. The TPM chip 10 includes, as a minimal configuration, an MPU 11, a control program 12 for controlling each unit, a secret-key file 13 for encrypting the operation log and the time-stamped operation log, a unit-information file 14 that stores at least an apparatus-identification number of each unit, a user-authentication information file 15 that stores a fingerprint information for authenticating a user, and a random access memory (RAM) 16 that stores the measured value related to the environment of each unit (i.e., temperature, humidity, altitude) and log information including setting parameter for operating each unit and a result of an operation.

Figure 7:
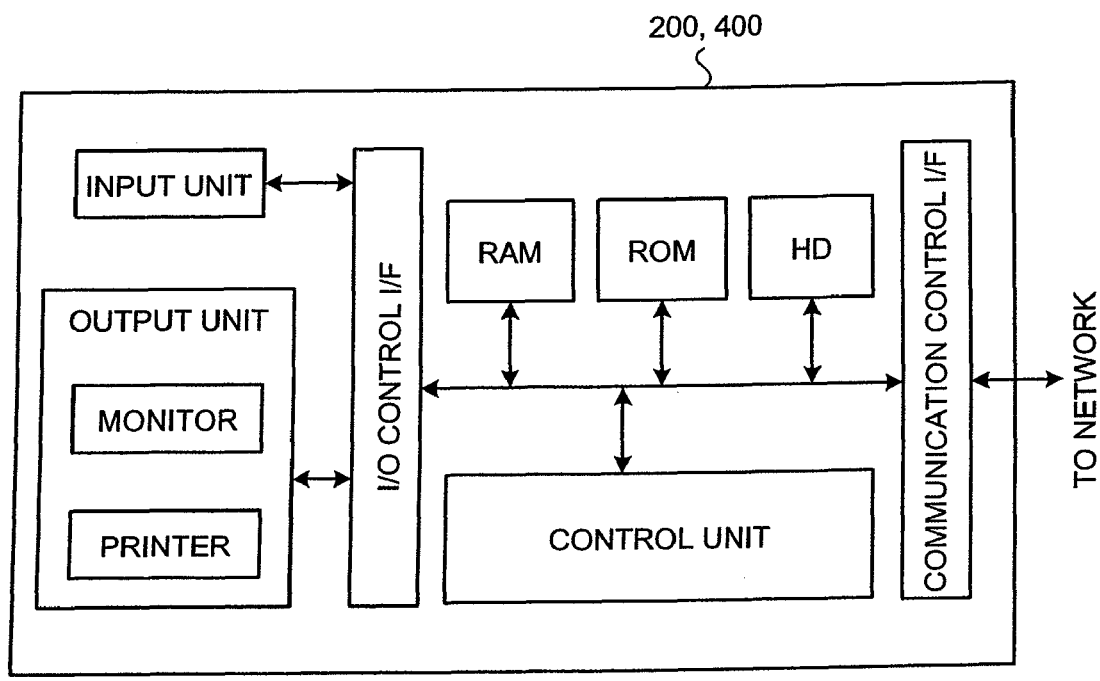
FIG. 7 is a block diagram of a server and a time server according to the present invention.

FIG. 7 is a block diagram of the server 200 and the time server 400. A hardware structure of the server 200 and the time server 400 can be configured with an information processing apparatus such as a workstation or a PC that can be commonly obtained in a market or with an attachment device of the information processing apparatus. Each function of the server 200 and the time server 400 can be realized with a control unit including a central processing unit (CPU) that structures hardware, a hard disk drive, a storage unit including a memory unit such as a RAM and a read only memory (ROM), an input unit, an output unit, input/output (I/O) control I/F, a communication control I/F, and a computer program that controls the above units.

Figure 8:
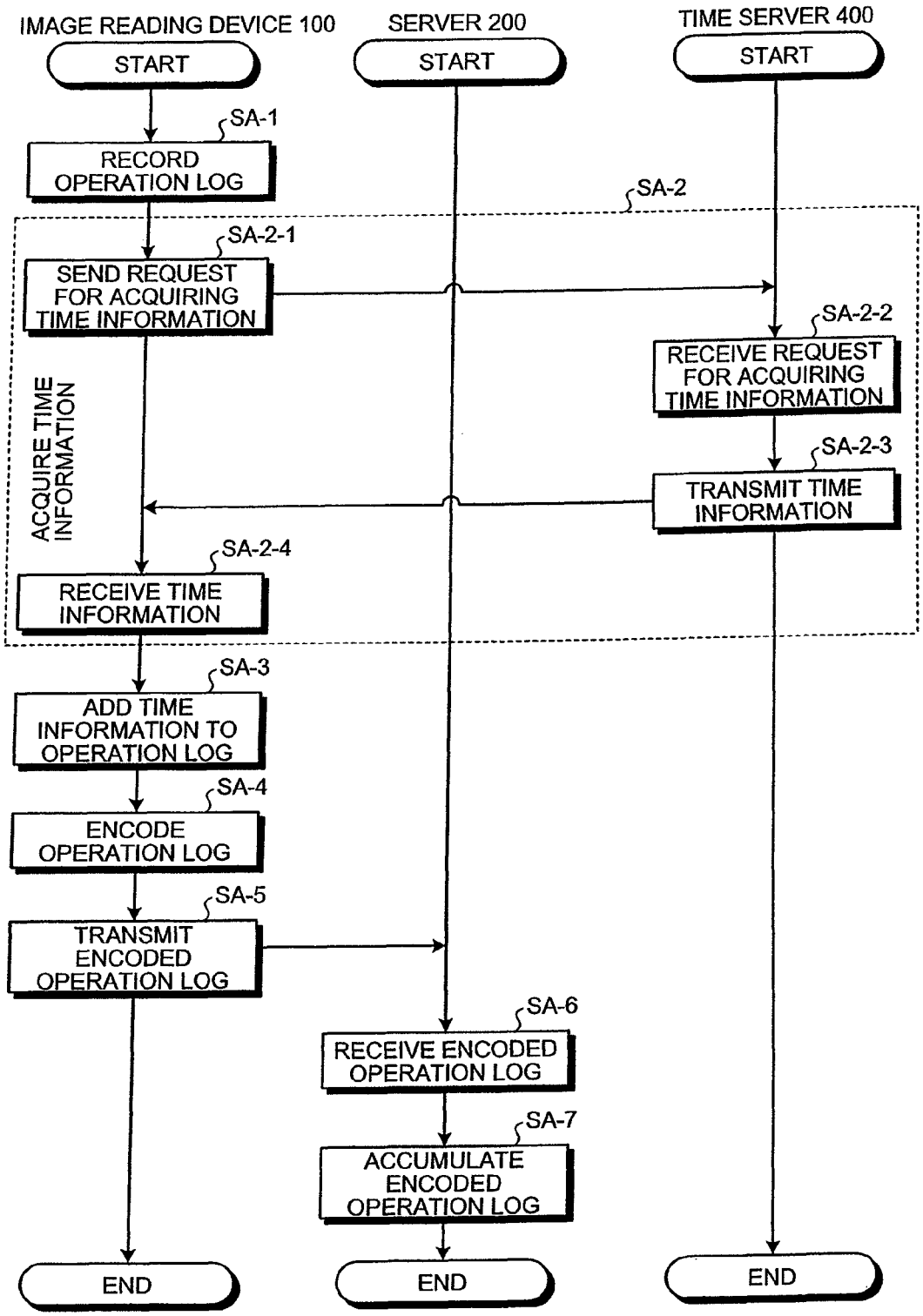
FIG. 8 is a flowchart of a processing procedure for an operation according to the first embodiment.

FIG. 8 is a flowchart of a processing procedure for an operation according to the first embodiment. It is assumed that the image reading apparatus 100 includes the temperature sensor, the humidity sensor, and the altitude sensor.

The image reading apparatus 100 records the operation log for operating the image reading apparatus (recording: step SA-1). The operation log includes at least one of a reading parameter for reading documents (i.e., a document size, sheet feed condition (ADF, FB, single side, double side), resolution, or color/monochrome), number of read documents, time of reading the document, an error code, error occurrence time, user-identification information for identifying a user, room temperature, temperature of the image reading apparatus, humidity, and altitude.

The image reading apparatus 100 acquires the time information from the time server 400 via the network 300 (acquiring: step SA-2). More specifically, the image reading apparatus 100 sends, at an acquiring unit, a request for acquiring the time information to the time server 400 via the network 300 (step SA-2-1). The time server 400 receives the request for acquiring the time information sent from the image reading apparatus 100 (step SA-2-2). The time server 400 sends the time information managed in the time server 400 to the image reading apparatus 100 via the network 300 (step SA-2-3). The image reading apparatus 100 receives, at the acquiring unit, the time information sent from the time server 400 (step SA-2-4). If a real-time clock is further installed in the image reading apparatus 100, the image reading apparatus 100 can acquire the time information at a predetermined time interval of acquiring the time information based on the real-time clock.

The image reading apparatus 100 attaches the time information acquired at step SA-2 to the operation log recorded at step SA-1 (attaching: step SA-3). The image reading apparatus 100 encrypts the time-stamped operation log generated by attaching the time information to the operation log at step SA-3, using the secret key unique to the image reading apparatus 100 (encrypting: step SA-4). The image reading apparatus 100 transmits the time-stamped operation log encrypted at step SA-4 to the server 200 via the network 300 (transmitting: step SA-5). The server 200 receives the time-stamped operation log transmitted from the image reading apparatus 100 (step SA-6). The server 200 accumulates the time-stamped operation log received at step SA-6 (step SA-7).

Figure 9:
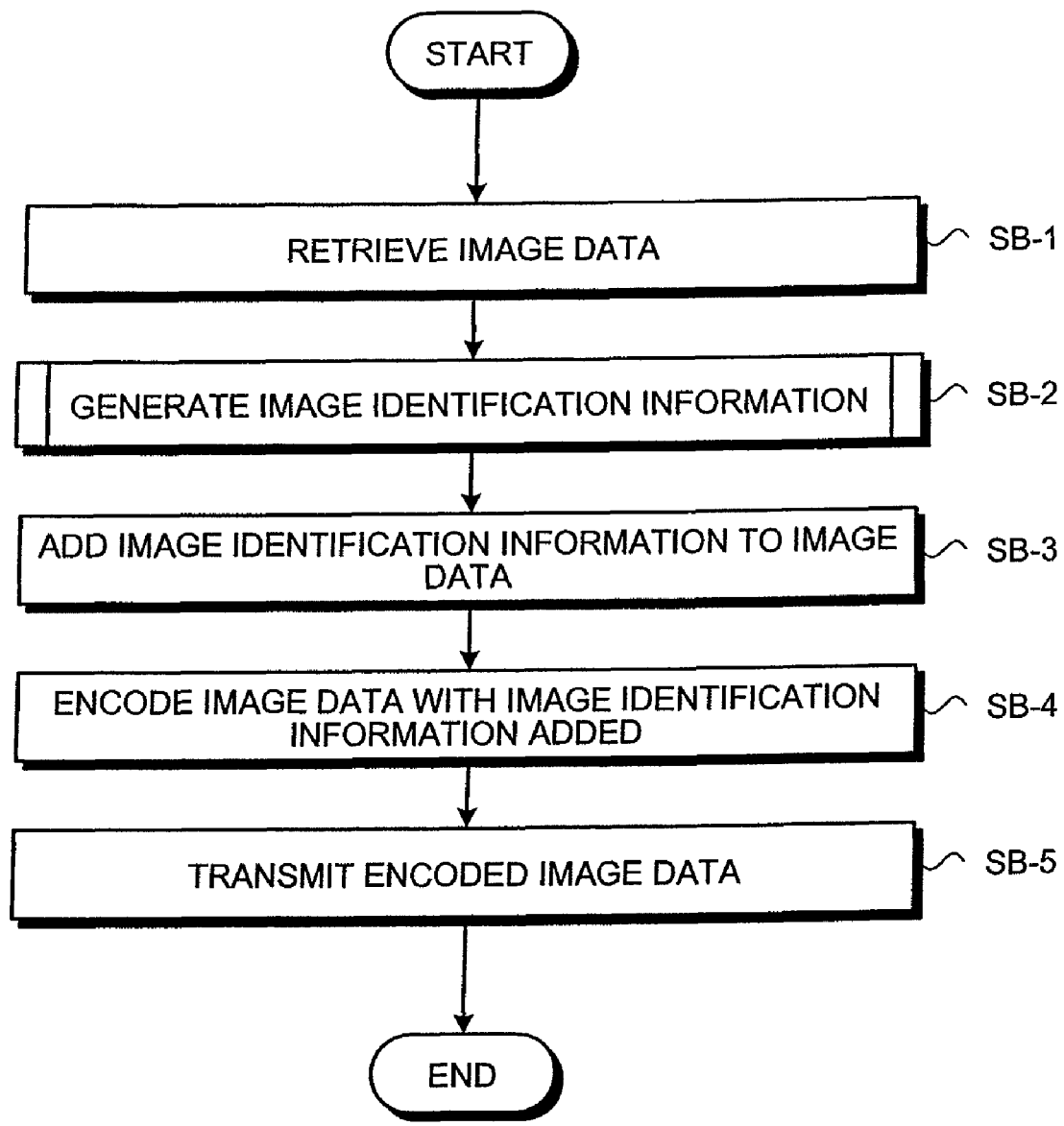
FIG. 9 is a flowchart of a processing procedure for an operation according to the first embodiment.

FIG. 9 is a flowchart of a processing procedure for an operation performed by the image reading apparatus 100. It is assumed that the image reading apparatus 100 includes the counter that updates the serial number, time-acquiring unit that acquires the time information from the time server 400, the temperature sensor, the humidity sensor, and the altitude sensor.

The image reading apparatus 100 retrieves image data (step SB-1). The image reading apparatus 100 generates the image identification information corresponding to the image data retrieved at step SB-1 (generating: step SB-2 (generating of the image identification information)).

Figure 10:
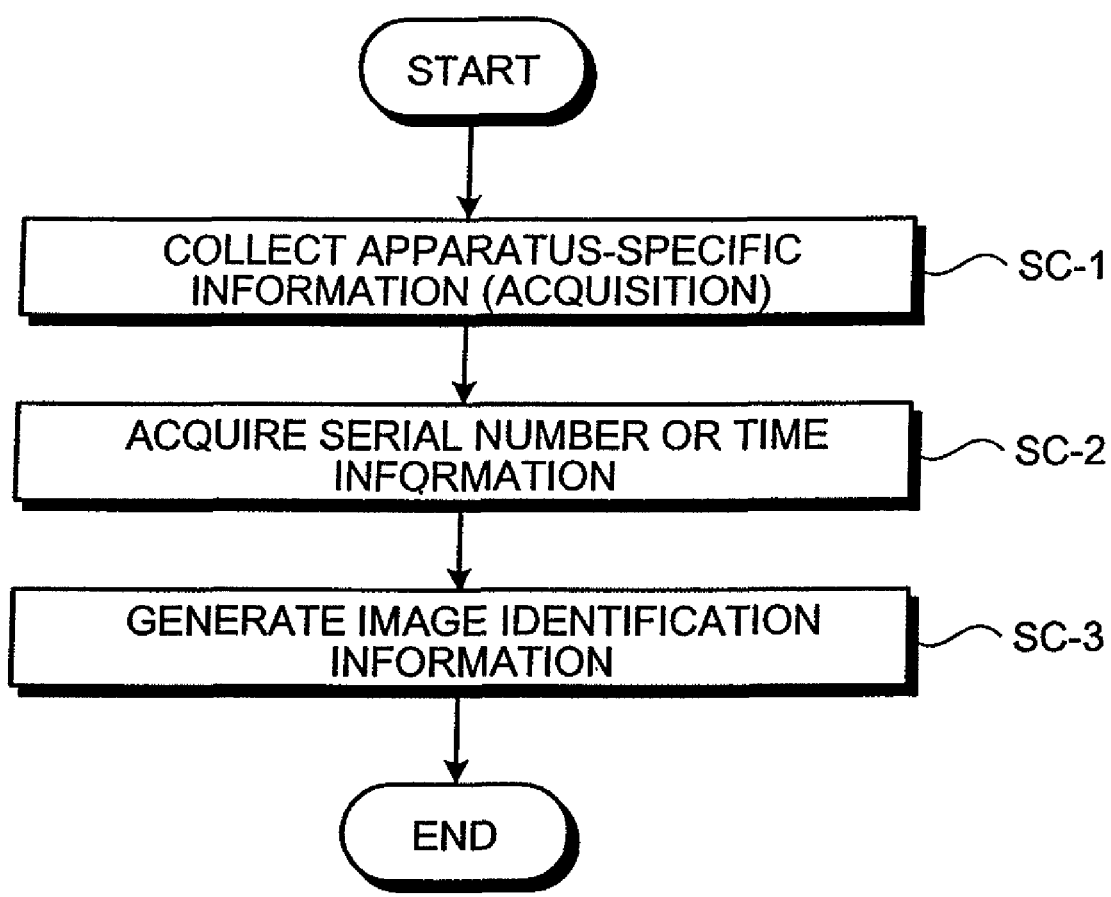
FIG. 10 is a flowchart of a processing procedure for an operation performed by the image reading apparatus shown in FIG. 5.

FIG. 10 is a flowchart of a processing procedure for an operation performed by the image reading apparatus 100 at step SB-2 shown in FIG. 9.

The image reading apparatus 100 collects (acquires) the apparatus-specific information through the TPM chip 10 (step SC-1). The image reading apparatus 100 acquires, through the TPM chip 10, the serial number updated at the counter (step SC-2). The image reading apparatus 100 can acquire the time information from the time server 400 instead of acquiring the serial number. The time information can be acquired with the same operation procedure as step SA-2 shown in FIG. 8. The image reading apparatus 100 generate the image identification information by combining the apparatus-specific information acquired at step SC-1 and the serial number (or the time information) acquired at step SC-2 (step SC-3).

Referring back to FIG. 9, the image reading apparatus 100, through the TPM chip 10, attaches the image identification information generated at step SB-2 to the image data retrieved at step SB-1 (attaching identification information: step SB-3). The image reading apparatus 100 encrypts, through the TPM chip 10, the image file to which the image identification information is attached at step SB-3, using the secret key stored in the TPM chip 10 (encrypting: step SB-4). The image reading apparatus 100 transmits the image file encrypted at step SB-4 to the server 200 (transmitting: step SB-5).

With the execution of the operation procedure shown in FIG. 9, the image reading apparatus 100 collects the operation log through the TPM chip 10, encrypts the collected operation log, through the TPM chip 10, using the secret key, and transmits the encrypted operation log to the server 200. When collecting the operation log, the image reading apparatus 100 can acquire other log items such as reading parameter, number of read document, time of reading documents, an error code, error occurrence time, user-identification information, room temperature, apparatus temperature, humidity, and altitude. Further, the image reading apparatus 100 generates, through the TPM chip 10, the operation log by combining the image identification information generated at step Sb-1 and the acquired other log items.

Figure 11:
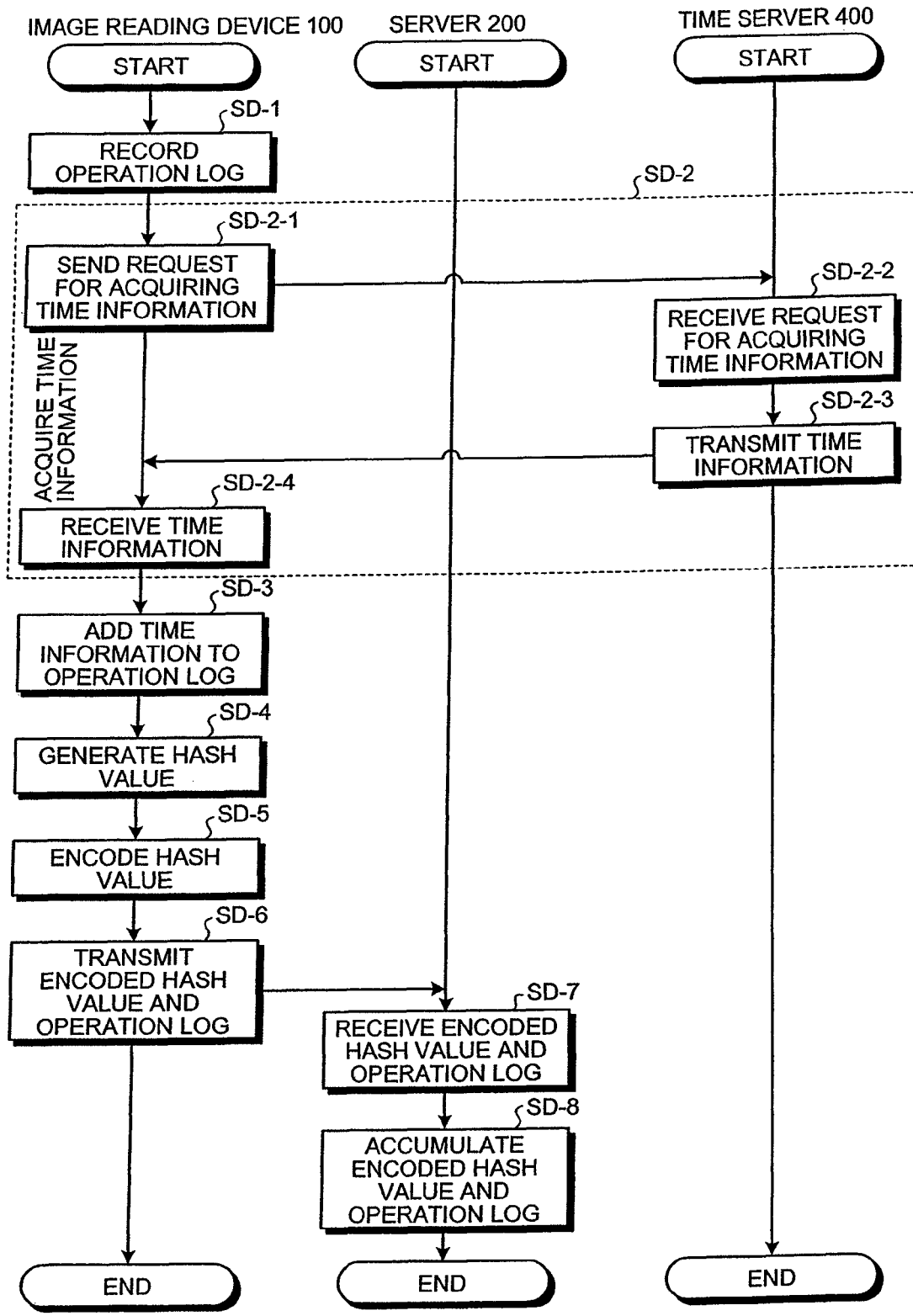
FIG. 11 is a flowchart of a processing procedure for an operation according to the second embodiment.

FIG. 11 is a flowchart of a processing procedure for an operation according to the second embodiment. It is assumed that the image reading apparatus 100 includes the temperature sensor, the humidity sensor, and the altitude sensor. The image reading apparatus 100 records the operation log of the operation for the image reading apparatus 100 (recording: step SD-1). The image reading apparatus 100 acquires the time information from the time server 400 via the network 300 (acquiring: step SD-2). The image reading apparatus 100 attaches the time information acquired at step SD-2 to the operation log recorded at step SD-1 (attaching: step SA-3). The image reading apparatus 100 generates the hash value corresponding to the time-stamped operation log generated by attaching the time information to the operation log at step SD-3 (generating hash-value: step SD-4). The image reading apparatus 100 encrypts, through the TPM chip 10, the hash value generated at step SD-4 using the secret key unique to the image reading apparatus 100 (encrypting: step SD-5). The image reading apparatus 100 transmits the hash value encrypted at step SD-4 and the time-stamped operation log to the server 200 via the network 300 (transmitting: step SD-6).

The server 200 receives the encrypted hash value and the time-stamped operation log transmitted from the image reading apparatus 100 (step SD-7). The server 200 accumulates the encrypted hash value and the time-stamped operation log received at step SD-7 (step SD-8). The image reading apparatus 100 can verify the credibility of the electronic signature (hash value) attached with the operation log, before or after accumulating the received time-stamped operation log. Namely, the image reading apparatus 100 can verify the operation log before or after accumulating the received operation log.

Figure 12:
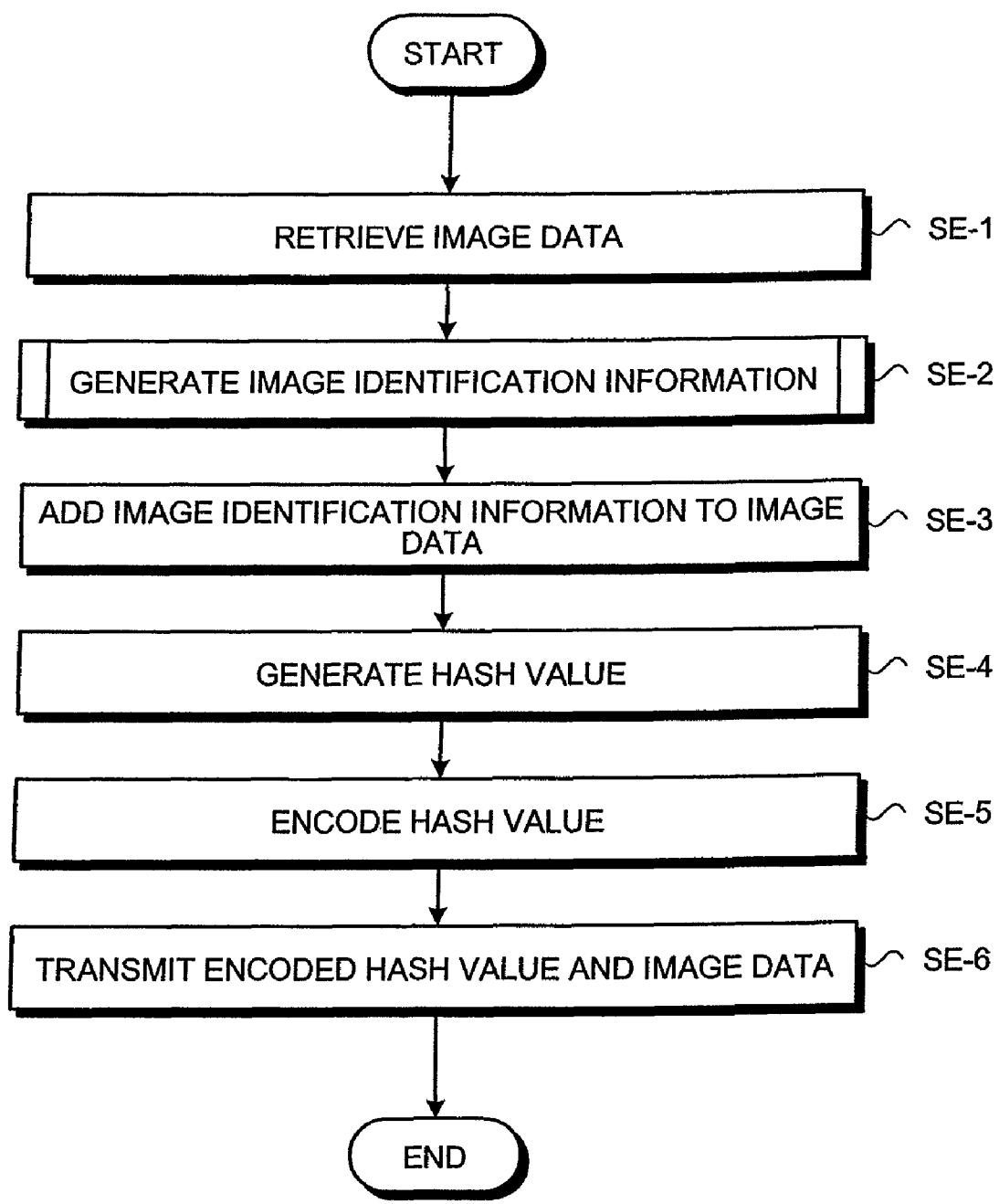
FIG. 12 is a flowchart of a processing procedure for an operation according to the second embodiment.

FIG. 12 is a flowchart of a processing procedure for an operation according to the second embodiment. It is assumed that the image reading apparatus 100 includes the counter that updates the serial number, time-acquiring unit that acquires the time information from the time server 400, the temperature sensor, the humidity sensor, and the altitude sensor.

The image reading apparatus 100 retrieves image data (step SE-1). The image reading apparatus 100 generates the image identification information corresponding to the image data retrieved at step SE-1 (generating: step SE-2 (generating of the image identification information)). The image reading apparatus 100, through the TPM chip 10, attaches the image identification information generated at step SE-2 to the image data retrieved at step SE-1 (attaching identification information: step SE-3). The image reading apparatus 100 generates the hash value corresponding to the image file to which the image identification information is attached at step SE-3 (hash-value generating: step SE-4). The image reading apparatus 100 encrypts, through the TPM chip 10, the hash value generated at step SE-4, using the secret key stored in the TPM chip 10 (encrypting: step SE-5). The image reading apparatus 100 transmits the hash value encrypted at step SE-5 and the image file to which the image identification information is attached at step SE-3, to the server 200 (transmitting: step SE-6).

With the execution of the operation procedure shown in FIG. 12, the image reading apparatus 100 collects the operation log through the TPM chip 10, generates the hash values corresponding to the collected operation log, encrypts, through the TPM chip 10, the generated hash value using the secret key, and transmits the encrypted hash value and the operation log to the server 200.

As explained above, according to the present invention, the image reading apparatus 100 records the operation log of the operation for the image reading apparatus 100, encrypts the recorded operation log through the TPM chip 10, and transmits the encrypted operation log to the server 200 via the network 300. Further, the image reading apparatus 100 records the operation log of the operation for the image reading apparatus 100, generates the hash value corresponding to the recorded operation log, encrypts the generated hash value through the TPM chip 10, and transmits the encrypted hash value and the operation log to the server 200 via the network 300. In other words, the data is transmitted with the electronic signature. On the other hand, the server 200 receives the operation log and the hash value transmitted from the image reading apparatus 100 and accumulates the operation log and the hash value. As a result, when the operation log is analyzed for a purpose of security or maintenance, reliability and credibility of the operation log can be assured.

Conventionally, if a fraudulent user reads a document with the image reading apparatus 100 to generate data of the document, and if the fraudulent user steals only the data, because the document itself is not stolen, logs recorded in the image reading apparatus 100 has been checked to determine whether the image reading apparatus 100 was fraudulently used. However, with the conventional technologies, because the logs can be easily altered, the reliability of the logs is low, resulting in degrading the reliability of a result of checking a fraud. On the other hand, if the image reading apparatus 100 is used, the electronic signature is attached to the logs through the TPM chip 10 having tamper-resistance. Therefore, it becomes possible to perform verification such that the logs are accurately generated by the image reading apparatus 100.

Further, fraudulent alteration of the logs caused by misoperation or malicious operation can be prevented, resulting in improving an efficiency of the maintenance. If the server 200 is installed in a maintenance service center, it becomes possible to investigate a trend such that an error is frequently occurred in a specific apparatus, by analyzing a large amount of logs at the maintenance service center.

The image reading apparatus 100 includes the temperature sensor, the humidity sensor, and the altitude sensor, which enables the image reading apparatus 100 to accurately acquire information related to an environment (climate or region) in which the image reading apparatus 100 is used.

The image reading apparatus 100 retrieves the image data, generates the image identification information through the TPM chip 10, attaches the generated image identification information to the image data through the TPM chip 10, encrypts the image data to which the image identification information is attached, using the secret key, and transmits the encrypted image data to the server 200. The image reading apparatus 100 retrieves the image data, generates the image identification information through the TPM chip 10, attaches the generated image identification information to the image data through the TPM chip 10, generates the hash value corresponding to the image data to which the image identification information is attached, encrypts the generated hash value using the secret key, and transmits the encrypted hash value and the image data to the server 200 via the network 300. Namely, the image data is transmitted with the electronic signature. As a result, it becomes possible to specify from which the image reading apparatus 100 the image data with a specific image ID is output, resulting in assuring the traceability of the image data. Further, because the image reading apparatus encrypts the image data with the image ID to the other devices, a fraudulent alteration of the image ID on the transmission path can be detected, resulting in improving the reliability of the image data.

The present invention in its broader aspects is not limited to the specific details and representative embodiments shown and described herein. Accordingly, various modifications may be made without departing from the spirit or scope of the general inventive concept as defined by the appended claims and their equivalents. For example, of the various types of processing explained in the description of the exemplary embodiments, it is acceptable to manually perform a part or all of the processing that is explained to be performed automatically. Conversely, it is acceptable to automatically perform, using a publicly-known technique, a part or all of the processing that is explained to be performed manually.

In addition, the processing procedures, the control procedures, the specific names, the information including various types of data and parameters, the images, and the database structures that are presented in the text and the drawings can be modified in any form, except when it is noted otherwise.

The constituent elements of the apparatuses shown in the drawings are based on functional concepts. The constituent elements do not necessarily have to be physically arranged in the way shown in the drawings. For example, a part or all of the processing functions offered by the apparatuses may be realized by a CPU and a program analyzed and executed by the CPU, or may be realized as hardware with wired logic. The programs are recorded in the recording medium, explained later, and to be mechanically acquired by the control unit as required.

A computer program that gives an instruction to the CPU in association with an operating system (OS) for performing various processing is stored in a storage unit such as a ROM or a hard disk (HD). The computer program is loaded into the RAM to be executed, and implements the control unit in cooperation with the CPU. The computer program can be stored in an application program server connected via a network and a part of or the entire computer program can be downloaded as required.

The computer program according to the present invention can be stored into a computer-readable recording medium including a removable physical medium, a built-in physical medium, and a communication medium that holds the program for a short time. The removable physical medium includes a flexible disk (FD), and magneto optical (MO) disk, a ROM, an erasable programmable read only memory (EPROM), an electrically erasable programmable read only memory (EEPROM), a compact disk-read only memory (CD-ROM), or a digital versatile disk (DVD). The built-in physical medium includes a ROM, a RAM, or a HD that is installed in the computer system. The communication medium includes a communication line or a carrier for transmitting the program via a network such as a local area network (LAN), a wide area network (WAN), or the Internet. The program is a data processing method written in arbitrary languages in arbitrary written formats, leading that both a source code and a binary code can be acceptable. The program is not necessarily prepared in a single structure and can be separately prepared as a plurality of modules or libraries.

Also, programs that realize the functions in association with other programs such as an OS can be included. The specific configurations for reading the recording medium in each unit according to the embodiments, reading procedures, and install procedures after the reading can be known configurations and procedures.

The specific mode in which the apparatuses are distributed and integrated is not limited to the ones shown in the drawings. A part or all of the apparatuses may be distributed or integrated functionally or physically in any arbitrary units, according to various loads and the status of use. For example, each database can be independently structured as an independent database apparatus and a part of the processing can be realized by a common gateway interface (CGI).

According to an embodiment of the present invention, when the operation log is analyzed for a purpose of security or maintenance, the reliability and the credibility of the operation log can be assured. Further, a mapping of the transmission path of the image data can be realized, resulting in securing the traceability of the image data.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image reading apparatus that is connected to a server via a network, the image reading apparatus comprising:
    a recording unit that records an operation log;
    a tamper-resistant chip including
        a storing unit that stores therein a secret key unique to the image reading apparatus; and
        an encrypting unit that encrypts recorded operation log with stored secret key; and
    a transmitting unit that transmits information including encrypted operation log to the server.

2. The image reading apparatus according to claim 1, further comprising:
    an acquiring unit that acquires time information from a time server that is connected to the image reading apparatus via the network, wherein
    the chip further includes an attaching unit that attaches acquired time information to the recorded operation log, and
    the encrypting unit encrypts time-information-attached operation log with the stored secret key.

3. The image reading apparatus according to claim 1, further comprising:
    at least one of a temperature sensor, a humidity sensor, and an altitude sensor.

4. The image reading apparatus according to claim 1, wherein
    the operation log includes at least one of document reading parameter, number of read documents, document reading time, error code, error occurrence time, user-identification information, room temperature, apparatus temperature, humidity, and altitude.

5. The image reading apparatus according to claim 1, further comprising:
    a generating unit that generates image identification information for identifying image data read by the image reading apparatus, wherein
    the chip further includes an identification-information attaching unit that attaches generated image identification information to read image data, and
    the encrypting unit further encrypts image-identification-information-attached image data with the stored secret key.

6. The image reading apparatus according to claim 5, wherein
    the operation log includes at least one of document reading parameter, number of read documents, document reading time, error code, error occurrence time, and user-identification information.

7. The image reading apparatus according to claim 5, further comprising:
    at least one of a temperature sensor, a humidity sensor, and an altitude sensor, wherein
    the operation log includes at least one of room temperature detected by the temperature sensor, apparatus temperature detected by the temperature sensor, humidity detected by the humidity sensor, and altitude detected by the altitude sensor.

8. The image reading apparatus according to claim 5, further comprising:
    either one of
        an acquiring unit that acquires time information from a time server that is connected to the image reading apparatus via the network; and
        an updating unit that updates a serial number stored of the image reading apparatus every time the image reading apparatus reads the image data, wherein
    the image identification information includes apparatus-specific information unique to the image reading apparatus and either one of acquired time information and updated serial number.

9. An image reading apparatus that is connected to a server via a network, the image reading apparatus comprising:
    a recording unit that records an operation log;
    a generating unit that generates a hash value corresponding to recorded operation log;
    a tamper-resistant chip including
        a storing unit that stores a secret key unique to the image reading apparatus; and
        an encrypting unit that encrypts generated hash value with stored secret key; and
    a transmitting unit that transmits information including encrypted hash value and the recorded operation log to the server.

10. The image reading apparatus according to claim 9, further comprising:
    an acquiring unit that acquires time information from a time server that is connected to the image reading apparatus via the network, wherein
    the chip further includes an attaching unit that attaches acquired time information to the recorded operation log, and
    the generating unit generates the hash value corresponding to time-information-attached operation log.

11. The image reading apparatus according to claim 9, further comprising:
    at least one of a temperature sensor, a humidity sensor, and an altitude sensor.

12. The image reading apparatus according to claim 9, wherein
    the operation log includes at least one of document reading parameter, number of read documents, document reading time, error code, error occurrence time, user-identification information, room temperature, apparatus temperature, humidity, and altitude.

13. The image reading apparatus according to claim 9, further comprising:

a generating unit that generates image identification information for identifying image data read by the image reading apparatus, wherein the chip further includes an identification-information attaching unit that attaches generated image identification information to read image data, and the generating unit generates the hash value corresponding to image-identification-information-attached image data.

14. The image reading apparatus according to claim 13, wherein the operation log includes at least one of document reading parameter, number of read documents, document reading time, error code, error occurrence time, and user-identification information.

15. The image reading apparatus according to claim 13, further comprising:

at least one of a temperature sensor, a humidity sensor, and an altitude sensor, wherein the operation log includes at least one of room temperature detected by the temperature sensor, apparatus temperature detected by the temperature sensor, humidity detected by the humidity sensor, and altitude detected by the altitude sensor.

16. The image reading apparatus according to claim 13, further comprising:

either one of
an acquiring unit that acquires time information from a time server that is connected to the image reading apparatus via the network; and
an updating unit that updates a serial number stored of the image reading apparatus every time the image reading apparatus reads the image data, wherein the image identification information includes apparatus-specific information unique to the image reading apparatus and either one of acquired time information and updated serial number.

17. A computer program product comprising a computer usable medium having computer readable program codes embodied in the medium that when executed cause a computer to execute:

recording an operation log;
encrypting recorded operation log with a secret key that is unique to an image reading apparatus, the secret key being stored in a tamper-resistant chip installed in the image reading apparatus; and
transmitting encrypted operation log to a server that is connected to the image reading apparatus via a network.

18. The computer program product according to claim 17, wherein the computer readable program codes further cause the computer to execute:
reading image data;
generating image identification information for identifying read image data; and
attaching generated image identification information to the read image data, the encrypting includes encrypting image-identification-information-attached image data with stored secret key, and the transmitting includes transmitting encrypted image data to the server.

19. A computer program product comprising a computer usable medium having computer readable program codes embodied in the medium that when executed cause a computer to execute:

recording an operation log;
generating a hash value corresponding to recorded operation log;
encrypting generated hash value with a secret key that is unique to an image reading apparatus, the secret key being stored in a tamper-resistant chip installed in the image reading apparatus; and
transmitting encrypted hash value and the recorded operation log to a server that is connected to the image reading apparatus via a network.

20. The computer program product according to claim 19, wherein the computer readable program codes further cause the computer to execute:
reading image data;
generating image identification information for identifying read image data; and
attaching generated image identification information to the read image data, the generating includes generating the hash value corresponding to image-identification-information-attached image data, and the transmitting includes transmitting the encrypted hash value and the image-identification-information-attached image data to the server.

* * * * *

UNITED STATES PATENT AND TRADEMARK OFFICE
CERTIFICATE OF CORRECTION

PATENT NO. : 7,916,328 B2
APPLICATION NO. : 11/622382
DATED : March 29, 2011
INVENTOR(S) : Kazutoshi Miyamura et al.

It is certified that error appears in the above-identified patent and that said Letters Patent is hereby corrected as shown below:

On the title page, the Assignees should read as follows:

Item (73) Assignee: PFU LIMITED, Ishikawa (JP)

FUJITSU LIMITED, Kanagawa (JP)

Signed and Sealed this
Ninth Day of August, 2011

David J. Kappos
*Director of the United States Patent and Trademark Office*